(12) United States Patent
Rubin et al.

(10) Patent No.: US 12,639,603 B2
(45) Date of Patent: May 26, 2026

(54) ITERATIVE CONSTRUCTION OF STATIONARY QUANTUM STATES USING QUANTUM COMPUTERS

(71) Applicant: Google LLC, Mountain View, CA (US)

(72) Inventors: Nicholas Charles Rubin, San Francisco, CA (US); Ryan Babbush, Venice, CA (US)

(73) Assignee: Google LLC, Mountain View, CA (US)

( * ) Notice: Subject to any disclaimer, the term of this patent is extended or adjusted under 35 U.S.C. 154(b) by 942 days.

(21) Appl. No.: 17/867,182

(22) Filed: Jul. 18, 2022

(65) Prior Publication Data

US 2023/0030423 A1 Feb. 2, 2023

Related U.S. Application Data

(60) Provisional application No. 63/222,533, filed on Jul. 16, 2021.

(51) Int. Cl.
*G06N 10/20* (2022.01)

(52) U.S. Cl.
CPC ..................................... *G06N 10/20* (2022.01)

(58) Field of Classification Search
CPC ......... G06N 10/20; G06N 10/40; G06N 10/60
See application file for complete search history.

(56) References Cited

U.S. PATENT DOCUMENTS

2015/0262072 A1* 9/2015 Stoltz ..................... H10N 60/12
                                                        438/2
2017/0076220 A1* 3/2017 Walters .................. G06N 10/40

FOREIGN PATENT DOCUMENTS

JP      2020-520026      7/2020

OTHER PUBLICATIONS

Alcoba, Diego Ricardo, et al. "On the measure of electron correlation and entanglement in quantum chemistry based on the cumulant of the second-order reduced density matrix." The Journal of chemical physics 133.14 (2010) (Year: 2010).*
Yoshioka, Nobuyuki, et al. "Constructing neural stationary states for open quantum many-body systems." Physical Review B 99.21 (2019): 214306 (Year: 2019).*

(Continued)

*Primary Examiner* — Omar F Fernandez Rivas
*Assistant Examiner* — Michael C. Lee
(74) *Attorney, Agent, or Firm* — Fish & Richardson P.C.

(57) ABSTRACT

Methods, systems and apparatus for preparing a target quantum state of a quantum system, where the target quantum state is stationary with respect to a parameterized many-body qubit operator. In one aspect a method includes preparing an initial quantum state as an input state for a first iteration; iteratively evolving the initial quantum state and subsequent input quantum states as inputs for subsequent iterations until an approximation of the target stationary quantum state is obtained, comprising, for each iteration: computing, by quantum computation, parameter values of the many-body qubit operator for the iteration; computing, by quantum computation, an evolution time for the iteration, comprising evaluating changes in elements of a 2-RDM for the iteration; and evolving the initial quantum state or the subsequent input quantum state for the iteration using the computed parameter values and evolution time to generate a subsequent input quantum state for the subsequent iteration.

18 Claims, 3 Drawing Sheets

(56)  References Cited

OTHER PUBLICATIONS

Fang, Kun, et al. "The sum-of-squares hierarchy on the sphere, and applications in quantum information theory." arXiv preprint arXiv:1908. 05155 (2019) (Year: 2019).*

Huggins, William J., et al. "A non-orthogonal variational quantum eigensolver." New Journal of Physics 22.7 (2020): 073009 (Year: 2020).*

Gomes, N., et al. "Adaptive variational quantum imaginary time evolution approach for quantum chemistry calculations." arXiv preprint arXiv:2102.01544 (Feb. 3, 2021) (Year: 2021).*

Babbush et al., "Chemical basis of Trotter-Suzuki errors in quantum chemistry simulation." Physical Review A 91.2, Feb. 2015: 022311, 17 pages.

Cariolaro et al., "Bloch-Messiah reduction of Gaussian unitaries by Takagi factorization." Physical Review A 94.6, 2016:062109, 7 pages.

Cohn et al., "Quantum filter diagonalization with double-factorized hamiltonians," Submitted on Apr. 2021, arXiv preprint arXiv:2104. 08957, 15 pages.

Google AI Quantum et al., "Hartree-Fock on a superconducting qubit quantum computer." Science 369.6507, Aug. 2020, 30 pages.

Grimsley et al., "Adapt-vqe: An exact variational algorithm for fermionic simulations on a quantum computer," Submitted on Dec. 28, 2018, arXiv preprint arXiv:1812.11173, 13 pages.

Helgaker et al., "Molecular electronic-structure theory" John Wiley & Sons, 2014, 104-106.

Kivlichan et al., "Quantum simulation of electronic structure with linear depth and connectivity." Physical review letters 120.11, Mar. 19, 2018: 110501, 8 pages.

Kokcu et al., "Fixed Depth Hamiltonian Simulation via Cartan Decomposition" Submitted on Jun. 29, 2022, arXiv preprint arXiv:2104. 00728, 21 pages.

Kottmann et al., "Optimized low-depth quantum circuits for molecular electronic structure using a separable pair approximation," Submitted on Mar. 2022, arXiv preprint arXiv:2105.03836, 16 pages.

Kutzelnigg, "Generalized k-particle brillouin conditions and their use for the construction of correlated electronic wavefunctions." Chemical Physics Letters 64.2, Jul. 1979, 383-387.

Lee et al., "Even more e cient quantum computations of chemistry through tensor hypercontraction," Submitted on Dec. 2021, arXiv preprint arXiv:2011.03494, 73 pages.

Lee et al., "Generalized unitary coupled cluster wave functions for quantum computation." Submitted on Jan. 2019, arXiv:1810. 02327v2, 45 pages.

Lee et al., "Stochastic resolution-of-the-identity auxiliary-eld quantum monte carlo: Scaling reduction without overhead" Submitted on Jul. 2020, arXiv:2005.11779v2, 34 pages.

Liu et al., "An efficient adaptive variational quantum solver of the Schrödinger equation based on reduced density matrices." Submitted on Dec. 2020, arXiv:2012.07047v1, 27 pages.

Matsuzawa et al., "Jastrow-type decomposition in quantum chemistry for low-depth quantum circuits" Submitted on Sep. 2019, arXiv:1909.12410v1, 11 pages.

Mazziotti, "Complete reconstruction of reduced density matrices." Chemical Physics Letters 326.3-4, Aug. 2000, 212-218.

McClean et al., "Openfermion: the electronic structure package for quantum computers" Quantum Science and Technology 5, 034014, Feb. 2019, 22 pages.

Motta et al., "Low rank representations for quantum simulation of electronic structure," Submitted on Aug. 2018, arXiv preprint arXiv:1808.02625, 8 pages.

Nooijen, "Can the eigenstates of a many-body hamiltonian be represented exactly using a general two-body cluster expansion?" Physical review letters 84.10, Mar. 2000, 2108-2111.

O'Gorman et al., "Generalized swap networks for near-term quantum computing" Submitted on May 2019, arXiv preprint arXiv:1905. 05118, 16 pages.

Rubin et al., "The fermionic quantum emulator" Submitted on Oct. 2021, arXiv preprint arXiv:2104.13944, 19 pages.

Sand et al., "Enhanced computational efficiency in the direct determination of the two-electron reduced density matrix from the anti-Hermitian contracted Schrödinger equation with application to ground and excited states of conjugated π-systems." The Journal of Chemical Physics 143.13, Oct. 2015: 134110, 9 pages.

Shepherd et al., "Temporally unstructured quantum computation." Proceedings of the Royal Society A: Mathematical, Physical and Engineering Sciences 465.2105, May 2009, 1413-1439.

Smart et al., "Efficient two-electron ansatz for benchmarking quantum chemistry on a quantum computer." Physical Review Research 2.2, Apr. 2020: 023048, 8 pages.

Sun et al., "Recent developments in the PySCF program package." Submitted on Jul. 2020, 21 pages.

Wecker et al., "Solving strongly correlated electron models on a quantum computer." Physical Review A 92.6, Dec. 2015: 062318, 27 pages.

White et al., "Numerical canonical transformation approach to quantum many-body problems." Submitted on Jan. 2002, arXiv:cond-mat/0201346v2>, 12 pages.

Wilcox, "Exponential operators and parameter differentiation in quantum physics" Journal of Mathematical Physics 8, Apr. 1967, 962-982.

Yanai et al., "Canonical transformation theory from extended normal ordering" Submitted on Jul. 2007, arXiv:0707.3128v1, 17 pages.

Yen et al., "Cartan sub-algebra approach to efficient measurements of quantum observables," Submitted on Sep. 2021, arXiv:2007. 01234, 11 pages.

Office Action in Canadian Appln. No. 3,225,821, mailed on Mar. 6, 2025, 5 pages.

International Preliminary Report on Patentability in International Appln. No. PCT/US2022/037304, mailed on Jan. 25, 2024, 15 pages.

Office Action in Australian Appln. No. 2022382627, mailed on Dec. 12, 2024, 2 pages.

Notice of Allowance in Australian Appln. No. 2022382627, mailed on Jan. 23, 2025, 3 pages.

Office Action in Japanese Appln. No. 2024-502158, mailed on Feb. 12, 2025, 8 pages (with English translation).

Notice of Allowance in Japanese Appln. No. 2024-502158, mailed on May 27, 2025, 5 pages (with English translation).

International Search Report and Written Opinion in International Appln. No. PCT/US2022/037304, mailed on Jul. 13, 2023, 21 pages.

Smart et al., "Resolving correlated states of benzyne on a quantum computer with error-mitigated quantum contracted eigenvalue solver" Submitted on Jun. 2021, arXiv:2103.06876v2, 35 pages.

* cited by examiner

1

ITERATIVE CONSTRUCTION OF STATIONARY QUANTUM STATES USING QUANTUM COMPUTERS

CROSS-REFERENCE TO RELATED APPLICATIONS

This application claims the benefit under 35 U.S.C. § 119(e) of U.S. Patent Application No. 63/222,533, filed Jul. 16, 2021. The disclosure of the foregoing application is incorporated herein by reference in its entirety for all purposes.

BACKGROUND

This specification relates to quantum computing.

Classical computers have memories made up of bits, where each bit can represent either a zero or a one. Quantum computers maintain sequences of quantum bits, called qubits, where each quantum bit can represent a zero, one or any quantum superposition of zeros and ones. Quantum computers operate by setting qubits in an initial state and controlling the qubits, e.g., according to a sequence of quantum logic gates.

SUMMARY

This specification describes an iterative process for constructing stationary quantum states on a quantum computer.

In general, one innovative aspect of the subject matter described in this specification can be implemented in a method for preparing a target quantum state of a quantum system, wherein the target quantum state is stationary with respect to a parameterized many-body qubit operator, the method comprising: preparing an initial quantum state as an input state for a first iteration; iteratively evolving the initial quantum state and subsequent input quantum states as inputs for subsequent iterations until an approximation of the target stationary quantum state is obtained, comprising, for each iteration: computing, by quantum computation, parameter values of the many-body qubit operator for the iteration; computing, by quantum computation, an evolution time for the iteration, comprising evaluating changes in elements of a two-electron reduced density matrix for the iteration; and evolving the initial quantum state or the subsequent input quantum state for the iteration using the computed parameter values and evolution time to generate a subsequent input quantum state for the subsequent iteration.

Other implementations of these aspects include corresponding computer systems, apparatus, and computer programs recorded on one or more computer storage devices, each configured to perform the actions of the methods. A system of one or more classical and/or quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations evaluating changes in elements of the two-electron reduced density matrix for the iteration comprises evaluating first order derivatives and second order derivatives of elements of a two-electron reduced density matrix for the iteration.

In some implementations computing, by quantum computation, an evolution time for the iteration comprises computing $$\lambda_i = -\frac{\langle H \mid D_i' \rangle}{\langle H \mid D_i'' \rangle}$$

where $\lambda_i$ represents the evolution time for the iteration i, H represents a Hamiltonian characterizing the quantum system, $D_i'$ represents a first order derivative of elements of the two-electron reduced density matrix for the iteration and $D_i''$ represents a second order derivative of elements of the two-electron reduced density matrix for the iteration.

In some implementations evaluating first order derivatives and second order derivatives of elements of the two-electron reduced density matrix for the iteration comprises using cumulant expansions.

In some implementations computing, by quantum computation, parameter values of the many-body qubit operator for the iteration comprises performing measurements of a 3-RDM.

In some implementations-evolving the initial quantum state or a subsequent input quantum state for the iteration using the computed parameter values and evolution time to generate an input quantum state for the subsequent iteration comprises approximating time evolution of the many-body qubit operator at the computed parameter values using a low rank double-factor decomposition.

In some implementations the low rank decomposition is implemented on a linear lattice of qubits with linear depth.

In some implementations evolving the initial quantum state or a subsequent input quantum state for the iteration using the computed parameter values and evolution time to generate an input quantum state for the subsequent iteration comprises approximating time evolution of the many-body qubit operator at the computed parameter values using a unitary compression of the many-body qubit operator.

In some implementations the unitary compression of the many-body qubit operator expresses the many-body qubit operator at the computed parameter values in a sum-of-squares form.

In some implementations the target stationary quantum state comprises a ground or excited quantum state.

In some implementations the initial quantum state is non-orthogonal to the target quantum state.

In some implementations the target quantum state comprises a state of a quantum system characterized by a Hamiltonian, and wherein the target quantum state satisfies stationarity conditions given by $$<\psi|[G,H]|\psi>=0,$$

where $|\psi>$ represents the target quantum state, H represents the Hamiltonian characterizing the quantum system, and G represents the parameterized many-body qubit operator.

In some implementations the stationarity condition comprises a first order stationarity condition of the energy with respect to variation of parameters of the many-body qubit operator.

In some implementations the parameterized many-body qubit operator comprises a fermionic two-body qubit operator.

In some implementations the fermionic two-body qubit operator is given by $$\Theta = \sum_{ijkl} \theta_{ijkl} a_i^\dagger a_j^\dagger a_k a_l,$$

where i,j,k,l are indices representing quantum system orbitals, $\theta$ represent real valued coefficients and $$a_j^\dagger, a_k$$

represent creation and annihilation operators, and the associated energy is given by $E(\Theta) = \langle \psi | e^{-\Theta} H e^{\Theta} | \psi \rangle$, where $| \psi \rangle$ represents the target quantum state, H represents the Hamiltonian characterizing the quantum system.

In some implementations the target quantum state is represented by a sequence of wavefunction transformations given by $$| \psi \rangle = e^{i\lambda_{i-1} A_{i-1}} e^{i\lambda_{i-2} A_{i-2}} \dots | \psi_0 \rangle$$

where $\lambda_i$ represents evolution time for iteration i, $A_i$ represents the many-body qubit operator with parameter values for iteration i, and $| \psi_0 \rangle$ represents the initial quantum state.

The subject matter described in this specification can be implemented in particular ways so as to realize one or more of the following advantages.

The presently described techniques can be used to construct quantum circuits that produce target stationary quantum states without the need for variational minimization. The target stationary quantum states can be ground states or excited states.

In addition, the quantum circuits can be compiled using low rank decompositions or unitary compression and therefore have a lower circuit depth, e.g., compared to conventional techniques that implement exact rotations to minimize energy. Accordingly, preparing target quantum states using the presently described techniques requires less computational resources and improves computational runtime. In addition, because of the reduction in circuit depth, the presently described techniques are particularly suitable for implementations that use near term quantum computing devices, e.g., noisy intermediate-scale quantum (NISQ) devices, where gate errors and T1 decay rate can cause long circuits to have noise that overwhelms any signal in the circuit.

In addition, a system implementing the presently described techniques can prepare target quantum states with improved accuracy, e.g., compared to conventional methods that are based on propagation of the anti-Hermitian contracted Schrödinger equation (ACSE) and suffer from non-exact 2-RDM evolution and an accumulation of error.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for constructing quantum circuits that produce a target quantum state that is stationary with respect to a parameterized many-body qubit operator. An initial quantum state is iteratively evolved until an approximation of the target stationary quantum state is obtained. At each iteration quantum computations are performed to compute parameter values of the many-body qubit operator for the iteration and a evolution time for the iteration. The evolution time is computed by evaluating changes in elements of a two-electron reduced density matrix for the iteration.

Figure 1:
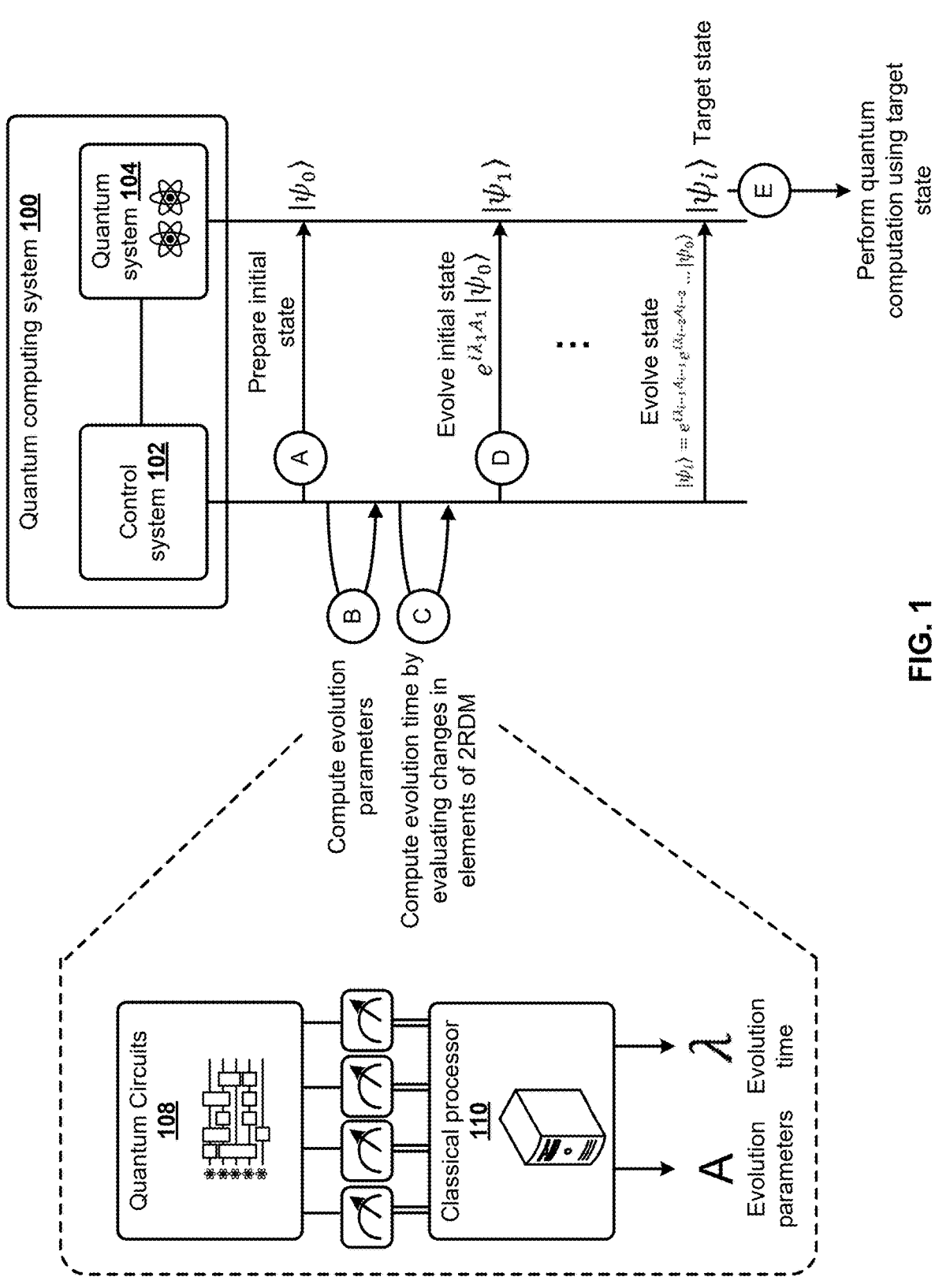
FIG. 1 is a block diagram of an example quantum computing system that prepares stationary quantum states.

FIG. 1 is a block diagram of an example quantum computing system 100 for performing the presently described quantum state preparation techniques. The example quantum computing system 100 is an example of a system implemented as classical and quantum computer programs on one or more classical computers and quantum computing devices in one or more locations, in which the systems, components, and techniques described herein can be implemented.

The example quantum computing system 100 includes a control system 102 that is configured to operate quantum systems, e.g., qubits, included in the quantum computing system 100 and to perform classical subroutines or computations. For example, the control system 102 can be programmed to send control signals to qubits included in the quantum computing system, e.g. to implement a quantum circuit, and to receive readout signals from the qubits, e.g. as part of performing measurement operations. In FIG. 1, the control system 102 performs operations to prepare the quantum system 104 in a target quantum state $| \psi_i \rangle$. The target quantum state is a quantum state that is stationary with respect to a parameterized many-body qubit operator and can be a ground or excited quantum state. Example target quantum states, stationarity conditions and parameterized many-body qubit operators are described below with reference to FIG. 2.

To prepare the quantum system 104 in the target quantum state, at stage (A), the control system 102 performs operations to set the quantum system 104 in an initial quantum state $| \psi_0 \rangle$, e.g., by resetting qubits included in the quantum system 104. The control system 102 then iteratively evolves the initial quantum state $| \psi_0 \rangle$ until the target stationary quantum state $| \psi_i \rangle$ is obtained.

At each iteration, the control system 102 performs stages (B)-(D). At stage (B), the control system performs quantum computations to compute parameter values of the many-body qubit operator for the iteration. As described below with reference to Equations (5) and (6), the parameter values $A_{ijkl}$ computed at stage (B) define an operator A that, when applied to the input quantum state for a time $\lambda$, evolves the input quantum state in such a way that minimizes the energy and approximately satisfies stationarity.

To compute the parameter values, the control system 102 performs quantum and classical computations. For example, for each parameter $A_{ijkl}$ as defined in Equation (6) below, the control system 102 can prepare a copy of the input quantum state for the iteration. The control system 102 can then apply a quantum circuit 108 that effects a qubit encoding of an observable to be measured, e.g., a qubit encoding of the terms in the observable $$[H, a_i^\dagger a_j^\dagger a_k a_l]$$

as defined in Equation (6) below, to the input quantum state. The control system 102 can then perform a measurement to obtain a respective measurement result. The control system 102 can repeat the state preparation, quantum circuit application, and measurement steps multiple times to obtain multiple measurement results. The control system 102 can then cause a classical processor 110 to post-process the measurement results and compute an expected value of the parameter value. The control system 102 can repeat this process for each parameter value until the many-body qubit operator A can be fully specified.

At stage (C), the control system performs quantum computations to compute an evolution time for the iteration. For example, the control system 102 can compute an evolution time λ by computing first order derivatives and second order derivatives of elements of a two-electron reduced density matrix for the iteration, as described below with reference to Equations (9)-(13). To compute the derivatives, the control system 102 performs classical and quantum operations similar to those described above with reference to stage (B). For example, to compute a first order derivative of a 2-RDM element the control system 102 can prepare a copy of the input quantum state for the iteration. The control system 102 can then apply a quantum circuit that effects a qubit encoding of an observable to be measured, e.g., a qubit encoding of the terms in the observable. The control system 102 can then perform a measurement to obtain a respective measurement result. The control system 102 can repeat the state preparation, quantum circuit application, and measurement steps multiple times to obtain multiple measurement results. The control system 102 can then cause a classical processor 110 to post-process the measurement results and compute an expected value of the parameter value. The control system 102 can repeat this process for the terms in Equation (13) until the evolution time λ can be fully specified.

At stage (D), the control system 102 uses the computed parameter values and evolution time to evolve the input quantum state for the iteration. For example, the control system 102 can apply a unitary operator $U=e^{iA\lambda}$ to the input quantum state for the iteration to evolve the input quantum state and generate a corresponding output quantum state. In some implementations the control system 102 can store data specifying the unitary operator for the iteration in a cache, e.g., to assist in preparing copies of the input quantum state as part of stages (B) and (C) in the next iteration.

If the iteration is a first iteration, the input quantum state is the initial quantum state $|\psi_0\rangle$ and the output quantum state is the evolved quantum state $|\psi_1\rangle=e^{iA_1\lambda_1}|\psi_0\rangle$. For a j-th subsequent iteration, the input quantum state is the output quantum state $|\psi_{j-1}\rangle$ for the previous (j−1)-th iteration and the output quantum state is a the evolved quantum state $|\psi_j\rangle=e^{iA_jA_j} \ldots e^{iA_2A_2}e^{iA_1A_1}|\psi_0\rangle$. The control system 102 can iteratively perform stages (B)-(D) until a predetermined number of iterations have been completed or until the output quantum state converges to within a predetermined convergence threshold. The predetermined convergence threshold can vary based on a target accuracy of the final output state, e.g., smaller convergence thresholds can produce more accurate final output states.

When the iterative process terminates, the quantum computing system 100 can provide the target quantum state for use in subsequent quantum computations. In some implementations the quantum computing system 100 can store data representing the unitary operator used to evolve the initial quantum state to the target quantum state, e.g., the unitary operator defined in Equation (8) below. Then, when the quantum computing system 100 requires a copy of the target quantum state, e.g., to perform quantum computations, the quantum computing system can retrieve the data representing the unitary operator and apply the unitary operator to an initial quantum state.

Example Process for Preparing a Target Stationary Quantum State

Figure 2:
FIG. 2 is a flow diagram of an example process for preparing a target stationary quantum state using a quantum computing system.
Figure 2:
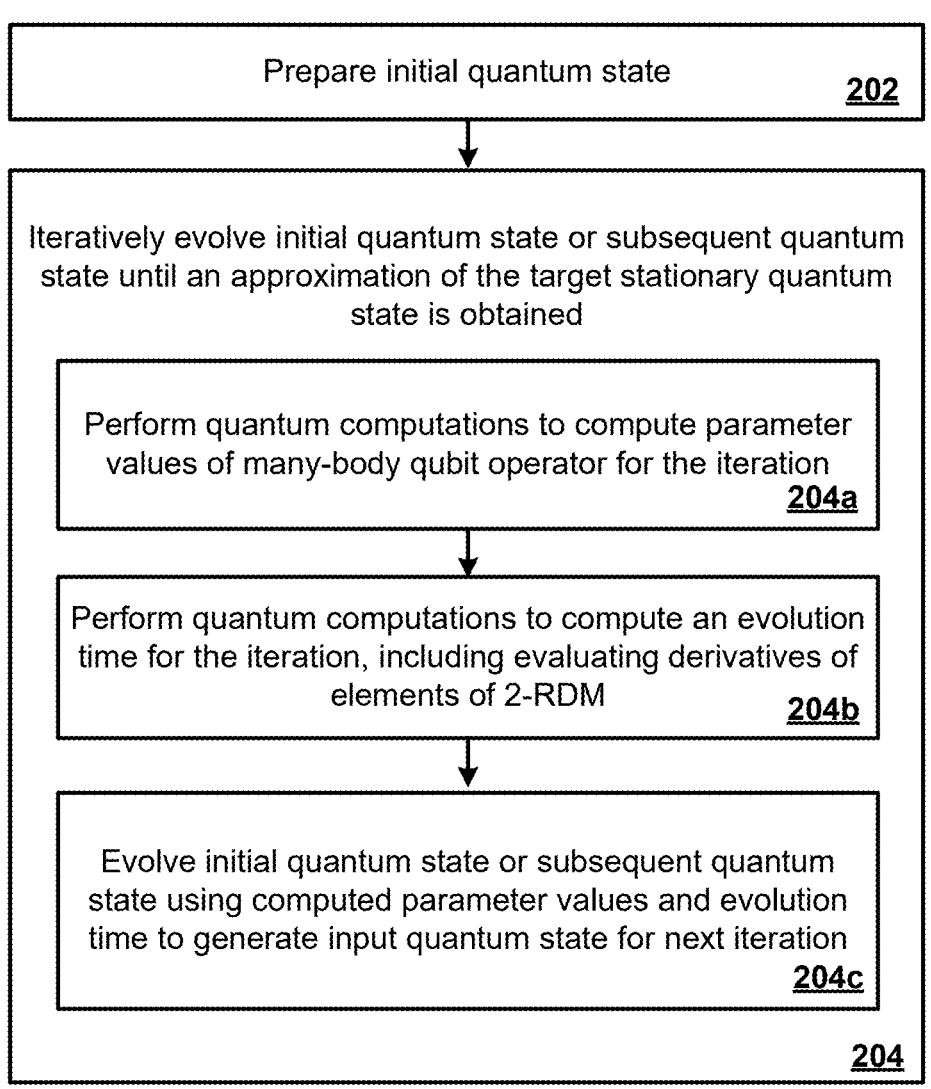

FIG. 2 is a flow diagram of an example process 200 for preparing a target quantum state. For convenience, the process 200 will be described as being performed by a system that includes a classical computer and a quantum computer. For example, the system 100 of FIG. 1, appropriately programmed in accordance with this specification, can perform the process 200.

The target quantum state can be a ground state or excited state of a quantum system characterized by a Hamiltonian H. The target quantum state is a stationary quantum state. For example, the target quantum state can be stationary with respect to a parameterized many-body qubit operator (e.g. a generator of a rotation) and satisfy stationarity conditions given by $$\langle\psi|[G,H]|\psi\rangle=0 \qquad (1)$$

where $|\psi\rangle$ represents the target quantum state, H represents the Hamiltonian characterizing the quantum system, and G represents the parameterized many-body qubit operator, i.e. that the expectation value of the commutator of the parameterized many-body qubit operator and the Hamiltonian for the target quantum state is zero. These stationarity conditions are first order stationarity conditions of the energy of the quantum system with respect to variation of parameters of the many-body qubit operator.

In some implementations the parameterized many-body qubit operator can be a fermionic two-body qubit operator. For example, the fermionic two-body qubit operator can be given by $$\Theta = \sum_{ijkl}\theta_{ijkl}a_i^\dagger a_j^\dagger a_k a_l \qquad (2)$$

where i,j,k,l are indices representing quantum system orbitals, θ represent real valued coefficients and $$a_j^\dagger, a_k$$

represent creation and annihilation operators. The associated energy can be given by $$E(\Theta)=\langle\psi|e^{-\Theta}He^{\Theta}|\psi\rangle \qquad (3)$$

where $|\psi\rangle$ represents the target quantum state, H represents the Hamiltonian characterizing the quantum system. Application of the Baker-Campbell-Hausdorff (BCH) expansion and differentiating at $\Theta=0$ gives $$\frac{\partial E(\Theta)}{\partial\theta_{ijkl}}\Big|_{\theta_{ijkl}=0} = \qquad (4)$$

-continued $$\frac{\partial}{\partial \theta_{ijkl}}\mid_{\theta_{ijkl}=0} \left( \langle \psi | H | \psi \rangle + \langle \psi | [H, G] | \psi \rangle + \frac{1}{2}\langle \psi | [[H, G], G] | \psi \rangle + \_ \right) =$$

$$\langle \psi | [H, a_i^\dagger a_j^\dagger a_k a_l] | \psi \rangle = 0 \quad (5)$$

which shows the commutator relationship is a first order stationary condition.

In implementations of the present disclosure the parameterized many-body qubit operator can be represented by an operator A whose coefficients are dictated by the stationarity condition given some trial state $|\psi_T\rangle$ as shown below $$A = \sum_{ijkl} A_{ijkl} a_i^\dagger a_j^\dagger a_k a_l \quad (5)$$

$$A_{ijkl} = \langle \psi_T | [H, a_i^\dagger a_j^\dagger a_k a_l] | \psi_T \rangle \quad (6)$$

As shown by the BCH expansion, this operator applied to the trial state or some time $\lambda$ will evolve the state in such a way that minimizes the energy and approximately satisfies stationarity. This is because the BCH expansion can be viewed as a Taylor expansion of the expectation value with respect to the rotation parameters. Appropriately selecting $\lambda$ will minimize the low-order Taylor expansion. Determining an amount of time $\lambda$ to evolve the state for is an important step of example process 200.

For convenience, the remaining description of example process 200 is described with reference to the case of particle conserving fermionic generators (many-body qubit operators) where the stationarity equations given at Equation (1) are Brillouin conditions. In this case there are $$\binom{n}{2} \times \binom{n}{2}$$

stationary conditions for a two-body fermionic generator with no restrictions on the coefficients, where n represents the number of spin-orbital basis functions. Example process 200 is used to construct a target quantum state $|\psi_f\rangle$ that satisfies these conditions using a quantum computer. This can be accomplished by starting from an initial state $|\psi_i\rangle$, computing a gradient using Equation (4), and evolving for some time $\lambda_i$ such that the next iteration $|\psi_{i+1}\rangle$ has a smaller residual value for the gradient, i.e. perform gradient descent on the wavefunction. Mathematically this sequence is expressed as $$|\psi_{i=1}\rangle = e^{i\lambda_i A_i}|\psi_i\rangle \quad (7)$$

where $A_i$ represents the many-body qubit operator evaluated using parameters for the current iteration i.

Because of the non-linear dependence of the objective function on the rotation angles, multiple evolution steps are required. That is, the i-th state $|\psi_i\rangle$ is generated by transforming the i −1-th state $|\psi_{i-1}\rangle$, which is generated by transforming the the i −2-th state $|\psi_{i-2}\rangle$ etc. That is, the target quantum state is represented by a sequence of wavefunction transformations given by $$|\psi_i\rangle = e^{i\lambda_{i-1}A_{i-1}} e^{i\lambda_{i-2}A_{i-2}} \dots |\psi_0\rangle \quad (8)$$

where $\lambda_i$ represents evolution time for iteration i, $A_i$ represents the many-body qubit operator with parameter values for iteration i, and $|\psi_0\rangle$ represents the initial quantum state.

At each iteration a gradient operator based on Equation (4) is obtained from the current iteration and the $\lambda_i$ for the current iteration is determined. A conventional procedure is to perform a line search optimization solving for $\lambda$ such that the energy is minimized. However, the variational search or line-search dependence can be removed by solving a second order BCH expansion by approximating the Hessian through short time propagation of the 2-RDM through cumulant reconstruction.

Equations (1)-(8) above track how the energy $\langle \psi_i | H | \psi_i \rangle$ evolved with respect to the operators given by Equation (4). However, through examination of how all $n^4$ elements of the 2-RDM evolve, where n is the number of spin-orbital basis functions, a similar quadratic approximation to their values at the i-th wavefunction can be obtained through truncation of the BCH expansion to second order. For example, representing all $n^4$ elements of the 2-RDM as $D_i$, the BCH expansion up to order 2 results in $$D_i = D_{i-1} + \lambda_{i-1} D_{i-1}' + \lambda_{i-1}^2 D_{i-1}'' \quad (9)$$

where the primes and double primes represent the derivatives with respect to $\lambda_{i-1}$. Each term in the 2-RDM term at i can be approximated by the BCH expansion $$\langle \psi_i | a_p^\dagger a_q^\dagger a_s a_r | \psi_i \rangle = \langle \psi_{i-1} | a_p^\dagger a_q^\dagger a_s a_r | \psi_{i-1} \rangle + \quad (10)$$

$$\lambda_{i-1} \langle \psi_{i-1} | [a_p^\dagger a_q^\dagger a_s a_r, A_{i-1}] | \psi_{i-1} \rangle + O(\lambda_{i-1}^2)$$

which dictates that first order derivative of all the 2-RDM elements have the form $$\frac{\partial D_{rs}^{pq}}{\partial \lambda_{i-1}} = \langle \psi_{i-1} | [a_p^\dagger a_q^\dagger a_s a_r, A_{i-1}] | \psi_{i-1} \rangle \quad (11)$$

Therefore, the task becomes that of minimizing a quadratic function an only depends on the gradient and approximate Hessian of the 2-RDM at step i −1.

$$\frac{\partial E}{\partial \epsilon} = 0 \quad (12)$$

$$\lambda_{i-1} = \epsilon_{opt} = -\frac{\langle H | D_{i-1}' \rangle}{\langle H | D_{i-1}'' \rangle} \quad (13)$$

In Equation (13), $\lambda_{i-1}$ represents the evolution time for the iteration i −1, H represents a Hamiltonian characterizing the quantum system, $D_{i-1}'$ represents a first order derivative of elements of the two-electron reduced density matrix for the iteration and $$D_{i-1}''$$

represents a second order derivative of elements of the two-electron reduced density matrix or the iteration. The inner products, $$\langle H | D_{i-1}' \rangle \text{ and } \langle H | D_{i-1}'' \rangle,$$

are Hilbert-Schmit inner products between a matrix representation of the Hamiltonian coefficient tensor and the 2-RDM first derivatives and second derivatives respectively. The evolution time step for the iteration i−1 is thus given by the negative of the Hilbert-Schmit inner product between the Hamiltonian and the first derivative of the 2-RDM, divided by the Hilbert-Schmit inner product between the Hamiltonian and the second derivative of the 2-RDM.

In other words, using the shorthand notation for $D_i$ to represent all expectation values of the 2-RDM (i.e. equation (10)) formed into a matrix variable, the first a d second derivatives of all 2-RDM elements are defined using equation (11) to be $D_{i-1}'$ and $D_{i-1}''$ respectively. These are matrices of all the coefficients corresponding to the first and second derivative of the corresponding 2-RDM element. Then the optimal time evolution step is determined from quadratic approximation to the similarity transformation of a 2-body operator can be expressed as Equation (13) where $\langle H|D_{i-1}'\rangle$ and $\langle H|D_{i-1}''\rangle$ are the Hilbert-Schmidt inner product between the matrix representation of the Hamiltonian coefficient tensor and the 2-RDM derivatives.

Determination of the optimal time step uses Hilbert-Schmit inner products between matrices of $O(N^4)$ size, which are not exponentially large quantum states. They can thus be determined efficiently.

Cumulant expansions can be used to evaluate the derivatives to obtain an approximation of the parameter $\lambda_{i-1}$ dictating how much to evolve along the gradient term $A_{i-1}$. A classical version of this theory propagates the anti-Hermitian contracted Schrödinger equation (ACSE), however this classical version suffers from non-exact 2-RDM evolution and accumulation of error. The presently described quantum version of this algorithm mitigates this problem.

In view of Equations (1)-(13) above, example process 200 can proceed as follows. The system prepares an initial quantum state $|\psi_0\rangle$, as described in Equation (8) above (step 202). The initial quantum state can be chosen to be non-orthogonal to the target quantum state. The system then iteratively evolves the initial quantum state and subsequent quantum states until an approximation of the target stationary quantum state is obtained (step 204). The accuracy of the approximation can depend on a predetermined acceptable accuracy, e.g., based on a predetermined convergence threshold.

At each iteration, the system performs quantum computations to compute parameter values of the many-body qubit operator for the iteration (step 204a). That is, the system computes values of the parameters $A_{ijkl}$ given in Equation (6) to define the many-body qubit operator for the iteration $A_i$.

In addition, at each iteration, the system performs quantum computations to compute an evolution time for the iteration (step 204b). Computing the evolution time for the iteration includes evaluating first order derivatives and second order derivatives of elements of a two-electron reduced density matrix for the iteration, e.g., using cumulant expansions. That is, the system performs measurement operations to determine $\lambda_i$ according to Equation (13) above.

Once the parameter values of the many-body qubit operator for the iteration $A_i$ and the evolution time for the iteration $\lambda_i$ have been computed, the system evolves the initial quantum state or a subsequent input quantum state for the iteration using the computed parameter values and evolution time to generate an input quantum state for the next iteration (step 204c). That is, the system evolves the initial quantum state or subsequent quantum state through Equation (7) above.

For a fully general $A_i$ this is prohibitively expensive. As described above, there are $$\binom{n}{2}\times\binom{n}{2}$$

terms in $A_i$. In general, the gradient will not be full rank and therefore in some implementations the time evolution under $A_i$ can be approximated through a low rank double-factor decomposition of $A_i$, where a significant number of terms are truncated. This can drastically reduce the circuit depth required to implement evolution under $A_i$ in comparison to exact two-body rotation that would minimize the energy. Each low-rank decomposition can be implemented on a linear lattice of qubits with linear depth. In some implementations, A will be low rank and therefore very few O(n) depth circuits will be required to implement a Trotterized form of A. Which also obeys spin blocking because A is constructed by examining rotations in each two-electron spin-sector $\{\alpha\alpha,\beta\beta,\alpha\beta\}$. The highest l rank of each component can then be evolved through a low-rank decomposition scheme. Due to the low rank nature of A very few factors will need to be implemented.

In other implementations the system can approximate the time evolution under $A_i$ by performing a unitary compression of the many-body qubit operator, where the unitary compression expresses the many-body qubit operator at the computed parameter values in a sum-of-squares form. Techniques for compressing many-body operators is described below.

Compressing Many-Body Operators with Sequential Orbital Optimization

A general tensor associated with a non-positive semidefinite operator can be decomposed into a sum-of-squares of normal operators and evolved with fermionic Gaussian unitaries and $n^2$ Ising interaction operators where the coefficient matrix for the Ising operator is rank one. The cost of implementing such an operator scales with the number of squared normal-operators are required to represent the operator. Conventional techniques attempt to lower this number by increasing the rank of the coefficient matrix for the Ising operator. In some cases a two-body operator being compressed is the Coulomb interaction term by a least-squares fitting. A drawback of this approach is the large number of free parameters and the, large number of optimization steps required to fit the tensor.

The present disclosure generalizes to the case of generic two-body operators and provides a greedy approach that naturally leads to fewer variables. This is achieved through sequentially finding a single-particle basis such that A has large coefficients for $n_i n_j$ terms. This component is then removed, leaving a remainder tensor. The procedure is repeated until the remainder is numerically zero or the norm is below a preset threshold. This greedy approach is always guaranteed to converge. A byproduct of the procedure is the $J_{ij}(1)$ matrix that is higher thank rank-1.

Consider a one-body transform of a generator. Given a two-body generator $$\hat{T} = \sum_{ijkl} t_{ij,kl} a_i^\dagger a_j a_k^\dagger a_l, \tag{14}$$

the orbital rotated generator is represented below as $$\tilde{T} = \hat{U}^\dagger(\kappa)\hat{T}\hat{U}(\kappa)$$

$$\tilde{T} = \sum_{pqrs} \tilde{t}_{pq,rs} a_i^\dagger a_j a_k^\dagger a_l \tag{15}$$

$$\tilde{t}_{pq,rs} = \sum_{pqrs} u_{pi}^* u_{qj} u_{rk}^* u_{sl}$$

such that the objective of maximizing the coefficients of the $n_i n_j$ component of $\tilde{T}$ can be expressed as $$\max_\kappa O(\kappa) \tag{16}$$

$$O(\kappa) = \sum_{xy} \left| \tilde{t}_{xx,yy}(\kappa) \right|^2$$

To optimize, the gradient is taken which yields $$\frac{\partial O(\kappa)}{\partial \kappa_{a,b}} = \sum_{xy} 2\tilde{t}_{xx,yy} \frac{\partial \tilde{t}_{xx,yy}}{\partial \kappa_{a,b}} \tag{17}$$

To calculate the partial derivative of $\tilde{t}$ coefficients with respect to the parameters of the generator $\kappa$ the form of $$\frac{\partial \tilde{T}}{\partial \kappa_{a,b}}$$

is first derived $$\frac{\partial \tilde{T}}{\partial \kappa_{a,b}} = \sum_{ijkl} t_{ij,kl}\left( \frac{\partial \hat{U}(\kappa)^\dagger}{\kappa_{ab}} a_i^\dagger a_j a_k^\dagger a_l \hat{U}(\kappa) + \hat{U}(\kappa)^\dagger a_i^\dagger a_j a_k^\dagger a_l \frac{\partial \hat{U}(\kappa)}{\partial \kappa_{a,b}} \right)$$

$$= \sum_{ijkl} t_{ij,kl} \hat{U}(\kappa)^\dagger \left[ a_i^\dagger a_j a_k^\dagger a_l, \sum_{mn} G_{mn}^{ab} a_m^\dagger a_n \right] \hat{U}(\kappa)$$

$$= \sum_{ijklr} t_{ij,kl} \hat{U}(\kappa)^\dagger \left( -G_{ri}^{ab} a_r^\dagger a_j a_k^\dagger a_l + G_{jr}^{ab} a_i^\dagger a_r a_l - G_{rk}^{ab} a_i^\dagger a_j a_r^\dagger a_l + G_{lr}^{ab} a_i^\dagger a_j a_k^\dagger a_r \right) \hat{U}(\kappa)$$

$$= \sum_{pqsi} V_{pq,si} a_p^\dagger a_q a_s^\dagger a_t \tag{18}$$

where $G^{ab}$ is the anti-Hermitian operator obtained from Duhamel's (Wilcox) formula for differentiating with respect to parameter $\kappa_{a,b}$ and $$V_{pq,st} = \sum_{ijklr} t_{ij,kl}\left( -G_{ri}^{ab} u_{rp}^* u_{jq} + G_{jr}^{ab} u_{ip}^* u_{rq} - G_{rk}^{ab} u_{ip}^* u_{lt} + G_{lr}^{ab} u_{ip}^* u_{jq} u_{rt} \right). \tag{19}$$

which uses $$U(\kappa)^\dagger a_i^\dagger U(\kappa) = \sum_p (e^k) a_p^\dagger = \sum_p u_{ip}^* a_p^\dagger \tag{20}$$

$$U(\kappa)^\dagger a_i U(\kappa) = \sum_p (e^k) a_p = \sum_p u_{ip} a_p.$$

Therefore,

-continued $$\frac{\partial \tilde{t}_{pq,st}}{\partial k_{ab}} = \sum_{ijklr} t_{ij,kl}\big( \tag{21}$$

$$-G_{ri}^{ab} u_{rp}^* u_{jq} u_{ks}^* u_{lt} + G_{jr}^{ab} u_{ip}^* u_{rq} u_{ks}^* u_{lt} - G_{rk}^{ab} u_{ip}^* u_{jq} u_{rs}^* u_{lt} + G_{lr}^{ab} u_{ip}^* u_{jq} u_{ks}^* u_{rt} \big)$$

which is a contraction that can be evaluated in $O(n^5)$ where n represent the number of spin-orbitals. There are a total of $n^2 \kappa_{ab}$ terms when considering the real and imaginary components and thus the total derivative is obtained in naively $O(n^7)$ operations.

This method of obtaining the gradient is general and sufficient for any continuous cost function depending on $\tilde{t}_{pq,sr}$. The general scaling can be reduced by considering the function that is being optimized and applying the chain rule. To see how this works consider differentiating Eq. (15) with respect to $\kappa_{ab}$ $$\frac{\partial O(\kappa)}{\partial \kappa_{ab}} = \sum_{cd} \frac{\partial O(\kappa)}{\partial u_{cd}}\left( \frac{\partial u}{\partial \kappa_{ab}} \right)_{cd} + \sum_{cd} \frac{\partial O(\kappa)}{\partial u_{cd}^*}\left( \frac{\partial u^*}{\partial \kappa_{a,b}} \right)_{cd} \tag{22}$$

Where $$\frac{\partial O(\kappa)}{\partial u_{cd}} = 2i \sum_{xy} \tilde{t}_{xx,yy} \frac{\partial \tilde{t}_{xx,yy}}{\partial u_{cd}} = 2i \sum_{yikl} t_{ickl} u_{id}^* u_{ky} u_{ly} + 2i \sum_{xijk} t_{ijke} u_{ix}^* u_{jx} u_{kd}^* \tilde{t}_{xx,dd} \tag{23}$$

$$\frac{\partial O(\kappa)}{\partial u_{cd}^*} =$$

$$2i \sum_{xy} \tilde{t}_{xx,yy} \frac{\partial \tilde{t}_{xx,yy}}{\partial u_{cd}^*} = 2i \sum_{yjkl} t_{cjkl} u_{jd} u_{ky}^* u_{ly} \tilde{t}_{dd,yy} + 2i \sum_{xijl} t_{ijcl} u_{ix}^* u_{jx} u_{ld} \tilde{t}_{xx,dd}$$

which for all $\{c,d\}$ is obtained in $O(n^5)$ once per total derivative call. The $n^2$ intermediates are reused for each $\kappa_{ab}$ derivative. Thus the overall scaling is $O(n^5)$. Using Duhamel's or Wilcox identity the partial derivative of the unitary or its Hermitian conjugate is $$\left( \frac{\partial u}{\partial \kappa_{ab}} \right)_{cd} = \sum_r G_{cr}^{ab} u_{rd}, \tag{24}$$

$$\left( \frac{\partial u^*}{\partial \kappa_{ab}} \right)_{cd} = \sum_r -G_{rc}^{ab} u_{rd}^*. \tag{25}$$

A check that this is all consistent with the $O(n^7)$ scaling method is multiplying Eq. (24) with $$\frac{\partial \tilde{t}_{xx,yy}}{\partial u_{cd}}$$

and summing over {c,d} which returns the appropriate terms in Eq. (21).

κ=0 Gradient Calculation

An example method to calculate the derivative is by updating the local basis of $\hat{T}$ such that the gradient of $\hat{T}$ with respect to $\kappa_{ab}$ is always calculated around κ=0. To see this first Taylor expand $\hat{T}$ around κ=0 using the BCH expansion $$\hat{T} = \hat{U}^{\dagger}(\kappa)\hat{T}\hat{U}(\kappa) \tag{26}$$

$$= \sum_{ijkl} t_{ij,kl}\left( a_i^{\dagger} a_j a_k^{\dagger} a_l + \sum_{mn} \kappa_{mn}[a_i^{\dagger} a_j a_k^{\dagger} a_l, a_m^{\dagger} a_n] \right) + O(\kappa^2)$$

now the derivative with respect to $\kappa_{ab}$ results in Kronecker delta functions reducing the complexity of the sum from fourth order to third order $$\frac{\partial \hat{T}}{\kappa_{ab}}\Big|_{k=0} = \sum_{ijk} -t_{bj,kl} a_a^{\dagger} a_j a_k^{\dagger} a_l +$$

$$\sum_{ikl} t_{ia,kl} a_i^{\dagger} a_b a_k^{\dagger} a_i + \sum_{ijl} -t_{ij,bl} a_i^{\dagger} a_j a_a^{\dagger} a_i + \sum_{ijk} t_{ij,ka} a_i^{\dagger} a_j a_k^{\dagger} a_b \tag{27}$$

which translates to copying the appropriate t coefficients into a new tensor to represent the gradient. The Hessian can be computed a similar way after taking the BCH expansion to second order and evaluating the derivative yielding Kronecker delta functions.

Recursively Fitting a Two-Body Generator

The objective function and gradient for maximizing the $n_i n_j$ component of a two-body operator is described above. Using this infrastructure a recursive technique for generating the compressed two-body operator is introduced. Starting from the target operator T Equation (16) is maximized to obtain a basis such that the $n_i n_j$ coefficients are largest in magnitude. These coefficients are selected out and stored along with the κ rotation. The operator represented by the diagonal coefficients is rotated back to the original basis with the κ obtained from the optimization and then the tensor is subtracted from the original generating a remainder. This procedure is repeated until the norm of the subtraction remainder is small and below a predetermined threshold. Using this approach the cost of the optimization is never more than sequential orbital optimizations. If the optimization is seeded with the iotations generated from the Takagi decomposition the procedure is guaranteed to converge.

Example Operating Environment

Figure 3:
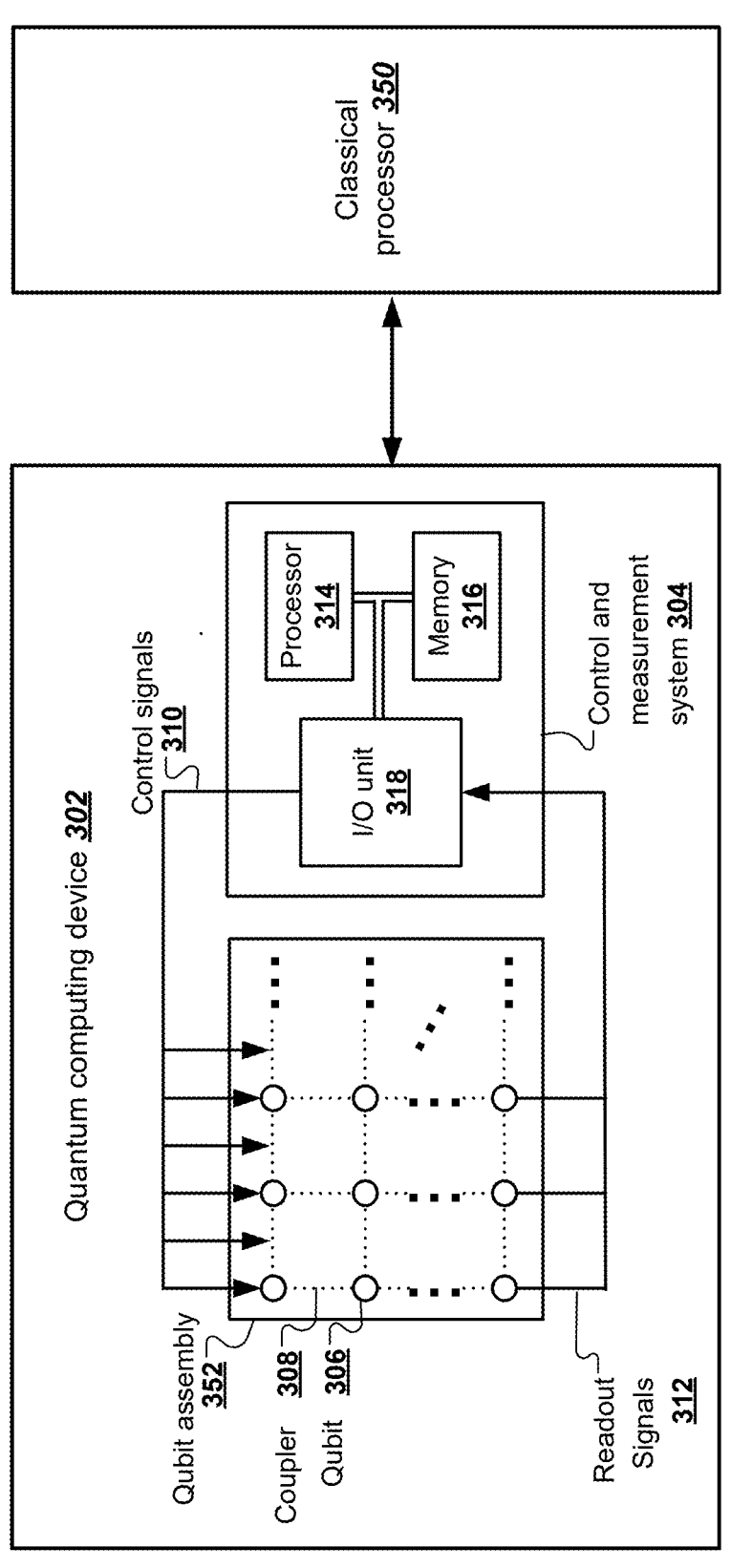
FIG. 3 is a diagram of an example quantum computing system.

FIG. 3 depicts an example classical/quantum computer 300 for performing some or all of the classical and quantum operations described in this specification. The example classical/quantum computer 300 includes an example quantum computing device 302. The quantum computing device 302 is intended to represent various forms of quantum computing devices. The components shown here, their connections and relationships, and their functions, are exemplary only, and do not limit implementations of the inventions described and/or claimed in this document.

The example quantum computing device 302 includes a qubit assembly 352 and a control and measurement system 304. The qubit assembly includes multiple qubits, e.g., qubit 306, that are used to perform algorithmic operations or quantum computations. While the qubits shown in FIG. 3 are arranged in a rectangular array, this is a schematic depiction and is not intended to be limiting. The qubit assembly 352 also includes adjustable coupling elements, e.g., coupler 308, that allow for interactions between coupled qubits. In the schematic depiction of FIG. 3, each qubit is adjustably coupled to each of its four adjacent qubits by means of respective coupling elements. However, this is an example arrangement of qubits and couplers and other arrangements are possible, including arrangements that are non-rectangular, arrangements that allow for coupling between non-adjacent qubits, and arrangements that include adjustable coupling between more than two qubits.

Each qubit can be a physical two-level quantum system or device having levels representing logical values of 0 and 1. The specific physical realization of the multiple qubits and how they interact with one another is dependent on a variety of factors including the type of the quantum computing device 302 included in the example computer 300 or the type of quantum computations that the quantum computing device is performing. For example, in an atomic quantum computer the qubits may be realized via atomic, molecular or solid-state quantum systems, e.g., hyperfine atomic states. As another example, in a superconducting quantum computer the qubits may be realized via superconducting qubits or semi-conducting qubits, e.g., superconducting transmon states. As another example, in a NMR quantum computer the qubits may be realized via nuclear spin states.

In some implementations a quantum computation can proceed b loading qubits, e.g., from a quantum memory, and applying a sequence of unitary operators to the qubits. Applying a unitary operator to the qubits can include applying a corresponding sequence of quantum logic gates to the qubits, e.g., to implement a quantum algorithm such as a quantum principle component algorithm. Example quantum logic gates include single-qubit gates, e.g., Pauli-X, Pauli-Y, Pauli-Z (also referred to as X, Y, Z), Hadamard gates, S gates, rotations, two-qubit gates, e.g., controlled-X, controlled-Y, controlled-Z (also referred to as CX, CY, CZ), controlled NOT gates (also referred to as CNOT) controlled swap gates (also referred to as CSWAP), and gates involving three or more qubits, e.g., Toffoli gates. The quantum logic gates can be implemented by applying control signals 310 generated by the control and measurement system 304 to the qubits and to the couplers.

For example, in some implementations the qubits in the qubit assembly 352 can be frequency tuneable. In these examples, each qubit can have associated operating frequencies that can be adjusted through application of voltage pulses via one or more drive-lines coupled to the qubit. Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tuneable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform multi-qubit gates.

The type of control signals 310 used depends on the physical realizations of the qubits. For example, the control signals may include RF or microwave pulses in an NMR or superconducting quantum computer system, or optical pulses in an atomic quantum computer system.

A quantum computation can be completed by measuring the states of the qubits, e.g., using a quantum observable such as X or Z, using respective control signals 310. The measurements cause readout signals 312 representing measurement results to be communicated back to the measurement and control system 304. The readout signals 312 may include RF, microwave, or optical signals depending on the physical scheme for the quantum computing device and/or the qubits. For convenience, the control signals 310 and readout signals 312 shown in FIG. 3 are depicted as addressing only selected elements of the qubit assembly (i.e. the top and bottom rows), but during operation the control signals 310 and readout signals 312 can address each element in the qubit assembly 352.

The control and measurement system 304 is an example of a classical computer system that can be used to perform various operations on the qubit assembly 352, as described above, as well as other classical subroutines or computations. The control and measurement system 304 includes one or more classical processors, e.g., classical processor 314, one or more memories, e.g., memory 316, and one or more I/O units, e.g., I/O unit 318, connected by one or more data buses. The control and measurement system 304 can be programmed to send sequences of control signals 310 to the qubit assembly, e.g. to carry out a selected series of quantum gate operations, and to receive sequences of readout signals 312 from the qubit assembly, e.g. as part of performing measurement operations.

The processor 314 is configured to process instructions for execution within the control and measurement system 304. In some implementations, the processor 314 is a single-threaded processor. In other implementations, the processor 314 is a multi-threaded processor. The processor 314 is capable of processing instructions stored in the memory 316.

The memory 316 stores information within the control and measurement system 304. In some implementations, the memory 316 includes a computer-readable medium, a volatile memory unit, and/or a non-volatile memory unit. In some cases, the memory 316 can include storage devices capable of providing mass storage for the system 304, e.g. a hard disk device, an optical disk device, a storage device that is shared over a network by multiple computing devices (e.g., a cloud storage device), and/or some other large capacity storage device.

The input/output device 318 provides input/output operations for the control and measurement system 304. The input/output device 318 can include D/A converters, A/D converters, and RF/microwave/optical signal generators, transmitters, and receivers, whereby to send control signals 310 to and receive readout signals 312 from the qubit assembly, as appropriate for the physical scheme for the quantum computer. In some implementations, the input/output device 318 can also include one or more network interface devices, e.g., an Ethernet card, a serial communication device, e.g., an RS-222 port, and/or a wireless interface device, e.g., an 802.11 card. In some implementations, the input/output device 318 can include driver devices configured to receive input data and send output data to other external devices, e.g., keyboard, printer and display devices.

Although an example control and measurement system 304 has been depicted in FIG. 3, implementations of the subject matter and the functional operations described in this specification can be implemented in other types of digital electronic circuitry, or in computer software, firmware, or hardware, including the structures disclosed in this specification and their structural equivalents, or in combinations of one or more of them.

The example system 300 also includes an example classical processor 350. The classical processor 350 can be used to perform classical computation operations described in this specification according to some implementations.

Implementations of the subject matter and operations described in this specification can be implemented in digital electronic circuitry, analog electronic circuitry, suitable quantum circuitry or, more generally, quantum computational systems, in tangibly-embodied software or firmware, in computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., CL or Quipper.

A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable computers, operating with one or more processors, as appropriate, executing one or more computer programs to perform functions by operating on input data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more computers to be "configured to" perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For example, a quantum computer may receive instructions from a digital computer that, when executed by the quantum computing apparatus, cause the apparatus to perform the operations or actions.

Computers suitable for the execution of a computer program can be based on general or special purpose processors, or any other kind of central processing unit. Generally, a central processing unit will receive instructions and data from a read-only memory, a random access memory, or quantum systems suitable for transmitting quantum data, e.g. photons, or combinations thereof.

The elements of a computer include a central processing unit for performing or executing instructions and one or more memory devices for storing instructions and digital, analog, and/or quantum data. The central processing unit and the memory can be supplemented by, or incorporated in, special purpose logic circuitry or quantum simulators. Generally, a computer will also include, or be operatively coupled to receive data from or transfer data to, or both, one or more mass storage devices for storing data, e.g., magnetic, magneto-optical disks, optical disks, or quantum systems suitable for storing quantum information. However, a computer need not have such devices.

Quantum circuit elements (also referred to as quantum computing circuit elements) include circuit elements for performing quantum processing operations. That is, the quantum circuit elements are configured to make use of quantum-mechanical phenomena, such as superposition and entanglement, to perform operations on data in a non-deterministic manner. Certain quantum circuit elements, such as qubits, can be configured to represent and operate on information in more than one state simultaneously. Examples of superconducting quantum circuit elements include circuit elements such as quantum LC oscillator, qubits (e.g., flux qubits, phase qubits, or charge qubits), and superconducting quantum interference devices (SQUIDs) (e.g., RF-SQUID or DC-SQUID), among others.

In contrast, classical circuit elements generally process data in a deterministic manner. Classical circuit elements can be configured to collectively carry out instructions of a computer program by performing basic arithmetical, logical, and/or input/output operations on data, in which the data is represented in analog or digital form. In some implementations, classical circuit elements can be used to transmit data to and/or receive data from the quantum circuit elements through electrical or electromagnetic connections. Examples of classical circuit elements include circuit elements based on CMOS circuitry, rapid single flux quantum (RSFQ) devices, reciprocal quantum logic (RQL) devices and ERSFQ devices, which are an energy-efficient version of RSFQ that does not use bias resistors.

In certain cases, some or all of the quantum and/or classical circuit elements may be implemented using, e.g., superconducting quantum and/or classical circuit elements. Fabrication of the superconducting circuit elements can entail the deposition of one or more materials, such as superconductors, dielectrics and/or metals. Depending on the selected material, these materials can be deposited using deposition processes such as chemical vapor deposition, physical vapor deposition (e.g., evaporation or sputtering), or epitaxial techniques, among other deposition processes. Processes for fabricating circuit elements described herein can entail the removal of one or more materials from a device during fabrication. Depending on the material to be removed, the removal process can include, e.g., wet etching techniques, dry etching techniques, or lift-off processes. The materials forming the circuit elements described herein can be patterned using known lithographic techniques (e.g., photolithography or e-beam lithography).

During operation of a quantum computational system that uses superconducting quantum circuit elements and/or superconducting classical circuit elements, such as the circuit elements described herein, the superconducting circuit elements are cooled down within a cryostat to temperatures that allow a superconductor material to exhibit superconducting properties. A superconductor (alternatively superconducting) material can be understood as material that exhibits superconducting properties at or below a superconducting critical temperature. Examples of superconducting material include aluminum (superconductive critical temperature of 1.2 kelvin) and niobium (superconducting critical temperature of 9.3 kelvin). Accordingly, superconducting structures, such as superconducting traces and superconducting ground planes, are formed from material that exhibits superconducting properties at or below a superconducting critical temperature.

In certain implementations, control signals for the quantum circuit elements (e.g., qubits and qubit couplers) may be provided using classical circuit elements that are electrically and/or electromagnetically coupled to the quantum circuit elements. The control signals may be provided in digital and/or analog form.

Computer-readable media suitable for storing computer program instructions and data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces here light is used for transmission and matter for storing and preserving the quantum features of quantum data such as superposition or quantum coherence.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or system that may include one or more processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer implemented method for preparing a target quantum state of a quantum system, wherein the target quantum state is stationary with respect to a parameterized many-body qubit operator, the method comprising:

preparing an initial quantum state as an input state for a first iteration;

iteratively evolving the initial quantum state and subsequent input quantum states as inputs for subsequent iterations until an approximation of the target stationary quantum state is obtained, comprising, for each iteration:

computing, by quantum computation, parameter values of the many-body qubit operator for the iteration;

computing, by quantum computation, an evolution time for the iteration, comprising evaluating first order derivatives and second order derivatives of elements of a two-electron reduced density matrix for the iteration; and evolving the initial quantum state or the subsequent input quantum state for the iteration using the computed parameter values and evolution time to generate a subsequent input quantum state for the subsequent iteration.

2. The method of claim 1, wherein evaluating first order derivatives and second order derivatives of elements of the two-electron reduced density matrix for the iteration comprises using cumulant expansions.

3. The method of claim 1, wherein computing, by quantum computation, parameter values of the many-body qubit operator for the iteration comprises performing measurements of a three-reduced density matrix.

4. The method of claim 1, wherein evolving the initial quantum state or a subsequent input quantum state for the iteration using the computed parameter values and evolution time to generate an input quantum state for the subsequent iteration comprises approximating time evolution of the many-body qubit operator at the computed parameter values using a low rank double-factor decomposition.

5. The method of claim 4, wherein the low rank double-factor decomposition is implemented on a linear lattice of qubits with linear depth.

6. The method of claim 1, wherein evolving the initial quantum state or a subsequent input quantum state for the iteration using the computed parameter values and evolution time to generate an input quantum state for the subsequent iteration comprises approximating time evolution of the many-body qubit operator at the computed parameter values using a unitary compression of the many-body qubit operator.

7. The method of claim 1, wherein the target stationary quantum state comprises a ground or excited quantum state.

8. The method of claim 1, wherein the initial quantum state is non-orthogonal to the target quantum state.

9. The method of claim 1, wherein the target quantum state comprises a state of a quantum system characterized by a Hamiltonian, and wherein the target quantum state satisfies stationarity conditions given by $$\langle \psi | [G,H] | \psi \rangle = 0,$$

where $|\psi\rangle$ represents the target quantum state, H represents the Hamiltonian characterizing the quantum system, and G represents the parameterized many-body qubit operator.

10. The method of claim 1, wherein the parameterized many-body qubit operator comprises a fermionic two-body qubit operator.

11. A computer implemented method for preparing a target quantum state of a quantum system, wherein the target quantum state is stationary with respect to a parameterized many-body qubit operator, the method comprising:

preparing an initial quantum state as an input state for a first iteration;

iteratively evolving the initial quantum state and subsequent input quantum states as inputs for subsequent iterations until an approximation of the target stationary quantum state is obtained, comprising, for each iteration:

computing, by quantum computation, parameter values of the many-body qubit operator for the iteration;

computing, by quantum computation, an evolution time for the iteration, comprising evaluating changes in elements of a two-electron reduced density matrix for the iteration, wherein computing, by quantum computation, an evolution time for the iteration comprises computing $$\lambda_i = -\frac{\langle H | D_i' \rangle}{\langle H | D_i'' \rangle}$$

where $\lambda_i$ represents the evolution time for iteration i, H represents a Hamiltonian characterizing the quantum system $$D_i'$$

represents a first order derivative of elements of the two-electron reduced density matrix for the iteration and $$D_i''$$

represents a second order derivative of elements of the two-electron reduced density matrix for the iteration; and evolving the initial quantum state or the subsequent input quantum state for the iteration using the computed parameter values and evolution time to generate a subsequent input quantum state for the subsequent iteration.

12. A computer implemented method for preparing a target quantum state of a quantum system, wherein the target quantum state is stationary with respect to a parameterized many-body qubit operator, the method comprising:

preparing an initial quantum state as an input state for a first iteration;

iteratively evolving the initial quantum state and subsequent input quantum states as inputs for subsequent iterations until an approximation of the target stationary quantum state is obtained, comprising, for each iteration:

computing, by quantum computation, parameter values of the many-body qubit operator for the iteration;

computing, by quantum computation, an evolution time for the iteration, comprising evaluating changes in elements of a two-electron reduced density matrix for the iteration; and evolving the initial quantum state or the subsequent input quantum state for the iteration using the computed parameter values and evolution time to generate a subsequent input quantum state for the subsequent iteration, wherein evolving the initial quantum state or a subsequent input quantum state for the iteration using the computed parameter values and evolution time to generate an input quantum state for the subsequent iteration comprises approximating time evolution of the many-body qubit operator at the computed parameter values using a unitary compression of the many-body qubit operator and wherein the unitary compression of the many-body qubit operator expresses the many-body qubit operator at the computed parameter values in a sum-of-squares form.

13. A computer implemented method for preparing a target quantum state of a quantum system, wherein the target quantum state is stationary with respect to a parameterized many-body qubit operator, the method comprising:

preparing an initial quantum state as an input state for a first iteration;

iteratively evolving the initial quantum state and subsequent input quantum states as inputs for subsequent iterations until an approximation of the target stationary quantum state is obtained, comprising, for each iteration:

computing, by quantum computation, parameter values of the many-body qubit operator for the iteration;

computing, by quantum computation, an evolution time for the iteration, comprising evaluating changes in elements of a two-electron reduced density matrix for the iteration; and evolving the initial quantum state or the subsequent input quantum state for the iteration using the computed parameter values and evolution time to generate a subsequent input quantum state for the subsequent iteration, wherein:

the target quantum state comprises a state of a quantum system characterized by a Hamiltonian, and wherein the target quantum state satisfies stationarity conditions given by $$\langle \psi | [G,H] | \psi \rangle = 0,$$

where $|\psi\rangle$ represents the target quantum state, H represents the Hamiltonian characterizing the quantum system, and G represents the parameterized many-body qubit operator; and the stationarity condition comprises a first order stationarity condition of the energy with respect to variation of parameters of the many-body qubit operator.

14. A computer implemented method for preparing a target quantum state of a quantum system, wherein the target quantum state is stationary with respect to a parameterized many-body qubit operator, the parameterized many-body qubit operator comprising a fermionic two-body qubit operator, the method comprising:

preparing an initial quantum state as an input state for a first iteration;
iteratively evolving the initial quantum state and subsequent input quantum states as inputs for subsequent iterations until an approximation of the target stationary quantum state is obtained, comprising, for each iteration:

computing, by quantum computation, parameter values of the many-body qubit operator for the iteration;
computing, by quantum computation, an evolution time for the iteration, comprising evaluating changes in elements of a two-electron reduced density matrix for the iteration; and
evolving the initial quantum state or the subsequent input quantum state for the iteration using the computed parameter values and evolution time to generate a subsequent input quantum state for the subsequent iteration, wherein the fermionic two-body qubit operator is given by $$\Theta = \sum_{ijkl} \theta_{ijkl} a_i^\dagger a_j^\dagger a_k a_l,$$

where i,j,k,l are indices representing quantum system orbitals, $\theta$ represent real valued coefficients and $$a_j^\dagger, a_k$$

represent creation and annihilation operators, and the associated energy is given by $E(\Theta) = \langle \psi | e^{-\Theta} H e^{\Theta} | \psi \rangle$, where $|\psi\rangle$ represents the target quantum state, H represents the Hamiltonian characterizing the quantum system.

15. A computer implemented method for preparing a target quantum state of a quantum system, wherein the target quantum state is stationary with respect to a parameterized many-body qubit operator, the method comprising:

preparing an initial quantum state as an input state for a first iteration;
iteratively evolving the initial quantum state and subsequent input quantum states as inputs for subsequent iterations until an approximation of the target stationary quantum state is obtained, comprising, for each iteration:

computing, by quantum computation, parameter values of the many-body qubit operator for the iteration;
computing, by quantum computation, an evolution time for the iteration, comprising evaluating changes in elements of a two-electron reduced density matrix for the iteration; and
evolving the initial quantum state or the subsequent input quantum state for the iteration using the computed parameter values and evolution time to generate a subsequent input quantum state for the subsequent iteration, wherein the target quantum state is represented by a sequence of wavefunction transformations given by $$|\psi\rangle = e^{i\lambda_{i-1}A_{i-1}} e^{i\lambda_{i-2}A_{i-2}} \ldots |\psi_0\rangle$$

where $\lambda_i$ represents evolution time for iteration i, $A_i$ represents the many-body qubit operator with parameter values for iteration i, and $|\psi_0\rangle$ represents the initial quantum state.

16. A system for operating a quantum computer, the system comprising:

one or more processors;
one or more I/O devices coupled to the one or more processors and configured to send control signals to and receive readout signals from the quantum computer; and
one or more memories having stored thereon computer readable instructions configured to cause the one more processors and the one or more I/O devices to carry out operations for preparing a target quantum state of a quantum system, wherein the target quantum state is stationary with respect to a parameterized many-body qubit operator, the operations comprising:

preparing an initial quantum state as an input state for a first iteration;
iteratively evolving the initial quantum state and subsequent input quantum states as inputs for subsequent iterations until an approximation of the target stationary quantum state is obtained, comprising, for each iteration:

computing, by quantum computation, parameter values of the many-body qubit operator for the iteration;
computing, by quantum computation, an evolution time for the iteration, comprising evaluating first order derivatives and second order derivatives of elements of a two-electron reduced density matrix for the iteration; and
evolving the initial quantum state or the subsequent input quantum state for the iteration using the computed parameter values and evolution time to generate a subsequent input quantum state for the subsequent iteration.

17. The system of claim 16, wherein the system further comprises the quantum computer.

18. A non-transitory computer readable medium storing instructions for execution by one more or more computers configured to send control signals to and receive readout signals from a quantum computer, the instructions causing the one or more computers to carry out operations for preparing a target quantum state of a quantum system, wherein the target quantum state is stationary with respect to a parameterized many-body qubit operator, the operations comprising:

preparing an initial quantum state as an input state for a first iteration;
iteratively evolving the initial quantum state and subsequent input quantum states as inputs for subsequent iterations until an approximation of the target stationary quantum state is obtained, comprising, for each iteration:

computing, by quantum computation, parameter values of the many-body qubit operator for the iteration;
computing, by quantum computation, an evolution time for the iteration, comprising evaluating first order derivatives and second order derivatives of elements of a two-electron reduced density matrix for the iteration; and
evolving the initial quantum state or the subsequent input quantum state for the iteration using the computed parameter values and evolution time to generate a subsequent input quantum state for the subsequent iteration.

* * * * *